(12) United States Patent
Krauss et al.

(10) Patent No.: US 9,503,443 B2
(45) Date of Patent: Nov. 22, 2016

(54) SECURE ACCESS SYSTEMS AND METHODS TO NETWORK ELEMENTS OPERATING IN A NETWORK

(71) Applicants: David Jordan Krauss, Centreville, VA (US); Stephen B. Alexander, Annapolis, MD (US); Loudon Thomas Blair, Severna Park, MD (US)

(72) Inventors: David Jordan Krauss, Centreville, VA (US); Stephen B. Alexander, Annapolis, MD (US); Loudon Thomas Blair, Severna Park, MD (US)

(73) Assignee: Ciena Corporation, Hanover, MD (US)

( * ) Notice: Subject to any disclaimer, the term of this patent is extended or adjusted under 35 U.S.C. 154(b) by 145 days.

(21) Appl. No.: 14/486,524

(22) Filed: Sep. 15, 2014

(65) Prior Publication Data

US 2016/0080342 A1    Mar. 17, 2016

(51) Int. Cl.
  *G06F 7/04* (2006.01)
  *H04L 29/06* (2006.01)
  *H04L 12/24* (2006.01)

(52) U.S. Cl.
  CPC .......... *H04L 63/08* (2013.01); *H04L 12/2461* (2013.01); *H04L 63/10* (2013.01); *H04L 67/42* (2013.01)

(58) Field of Classification Search
  CPC .... H04L 63/08; H04L 67/42; H04L 12/2461
  See application file for complete search history.

(56) References Cited

U.S. PATENT DOCUMENTS

| | | |
|---|---|---|
| 5,798,855 A | 8/1998 | Alexander et al. |
| 5,815,571 A * | 9/1998 | Finley ............... G06F 21/50 380/2 |
| 6,088,451 A | 7/2000 | He et al. |
| 6,785,843 B1 * | 8/2004 | McRae ............... H04L 45/00 714/23 |
| 7,190,896 B1 | 3/2007 | Wang et al. |
| 7,353,374 B1 * | 4/2008 | Trimberger ...... H03K 19/17732 713/1 |
| 7,574,735 B2 | 8/2009 | Pirttiman et al. |
| 7,640,581 B1 | 12/2009 | Brenton et al. |
| 7,840,692 B1 | 11/2010 | Monga et al. |
| 8,218,570 B2 | 7/2012 | Moran et al. |
| 8,218,572 B2 | 7/2012 | Moran et al. |
| 8,402,121 B2 | 3/2013 | Skalecki et al. |
| 8,417,111 B2 | 4/2013 | Moynihan et al. |
| 8,433,192 B2 | 4/2013 | Frankel et al. |
| 8,456,984 B2 | 6/2013 | Ranganathan et al. |
| 8,467,375 B2 | 6/2013 | Blair |
| 8,626,160 B2 | 1/2014 | Zhu |
| 8,707,395 B2 | 4/2014 | Sahay et al. |
| 8,818,198 B2 | 8/2014 | Trnkus et al. |
| 2002/0147920 A1 * | 10/2002 | Mauro ................. G06Q 20/367 726/26 |
| 2008/0282345 A1 * | 11/2008 | Beals ...................... G06F 21/51 726/21 |
| 2009/0193230 A1 * | 7/2009 | Findeisen ............. G06F 21/445 712/34 |
| 2010/0083387 A1 * | 4/2010 | Rodgers ................. G06F 21/81 726/36 |
| 2011/0013911 A1 | 1/2011 | Alexander et al. |

(Continued)

*Primary Examiner* — Techane Gergiso
(74) *Attorney, Agent, or Firm* — Clements Bernard PLLC; Christopher L. Bernard; Lawrence A. Baratta, Jr.

(57) ABSTRACT

A network element, configured to operate in a network to provide various network functions therein, includes a main processor communicatively coupled to a main memory, wherein the main processor is configured to perform Operations, Administration, Maintenance, and Provisioning (OAM&P) associated with the network element, wherein the main processor is accessible through one or more access techniques; and a supervisory plane comprising a secure processor and a secure memory communicatively coupled thereto, wherein the supervisory plane is separate from and communicatively coupled to the main processor and the main memory, the supervisory plane is configured to allow secure, direct access to the main processor and the main memory.

20 Claims, 8 Drawing Sheets

(56) References Cited

U.S. PATENT DOCUMENTS

| | | | |
|---|---|---|---|
| 2011/0161645 A1* | 6/2011 | Zhang | G06F 21/575 713/2 |
| 2012/0011351 A1* | 1/2012 | Mundra | G06F 21/72 713/1 |
| 2012/0084487 A1* | 4/2012 | Barde | G06F 9/45541 711/6 |
| 2012/0166618 A1* | 6/2012 | Dahod | H04L 47/20 709/224 |
| 2012/0226824 A1 | 9/2012 | Trnkus et al. | |
| 2012/0265875 A1 | 10/2012 | Moran et al. | |
| 2013/0246268 A1* | 9/2013 | Moshfeghi | G06Q 20/40145 705/44 |
| 2013/0266141 A1* | 10/2013 | Kim | H04W 12/02 380/270 |
| 2014/0036730 A1* | 2/2014 | Nellikar | H04L 49/70 370/255 |
| 2014/0189810 A1* | 7/2014 | Gupta | H04L 67/327 726/4 |
| 2014/0208094 A1 | 7/2014 | Rajsie et al. | |
| 2014/0219649 A1 | 8/2014 | Suryaputra et al. | |
| 2015/0089213 A1* | 3/2015 | Isozaki | G06F 21/74 713/155 |
| 2015/0286817 A1* | 10/2015 | Haddad | G06F 21/50 726/3 |
| 2015/0373038 A1* | 12/2015 | Blackwell | G06F 21/554 726/23 |
| 2016/0063462 A1* | 3/2016 | Whytock | G06Q 20/3829 705/71 |

\* cited by examiner

SECURE ACCESS SYSTEMS AND METHODS TO NETWORK ELEMENTS OPERATING IN A NETWORK

FIELD OF THE DISCLOSURE

The present disclosure relates generally to networking systems and methods. More particularly, the present disclosure relates to secure access systems and methods to network elements operating in a network.

BACKGROUND OF THE DISCLOSURE

Optical networks and the like (e.g., DWDM, Synchronous Optical Network (SONET), Synchronous Digital Hierarchy (SDH), Optical Transport Network (OTN), Ethernet, and the like) at various layers are being deployed in next-generation networks with control planes, Software Defined Networking (SDN), Network Functions Virtualization (NFV), and the like. Control planes provide automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2005), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections to route the connections and program the underlying hardware accordingly. A control plane generally operates in a distributed fashion, by and between various network elements in a network. Similarly, an SDN controller and NFV also operate in a distributed fashion. In view of the architectures of these systems and methods, access to one component in a network can provide a user widespread access to the overall network.

The network elements each generally include a controller, which can also be referred to as a shelf processor, network controller, operations controller, maintenance interface, etc. Conventionally, implementations of network elements use shared memory and shared processors. As a result, a compromise of either of these can result in the entire device becoming inaccessible or nonresponsive. Furthermore, any data stored in memory could also be compromised and then become accessible by unauthorized personnel or agents. In present state-of-the-art network devices, once that device is compromised, all its data and functionality come under control of whoever or whatever has compromised the device. This could lead to loss of control of the network, malicious conduct, and the like affecting the network device, the control plane, the SDN controller, NFV functions, and the network.

BRIEF SUMMARY OF THE DISCLOSURE

In an exemplary embodiment, a network element, configured to operate in a network to provide various network functions includes a main processor communicatively coupled to a main memory, wherein the main processor is configured to perform Operations, Administration, Maintenance, and Provisioning (OAM&P) associated with the network element, wherein the main processor is accessible through one or more access techniques; and a supervisory plane including a secure processor and a secure memory communicatively coupled thereto, wherein the supervisory plane is separate from and communicatively coupled to the main processor and the main memory, the supervisory plane is configured to allow secure, direct access to the main processor and the main memory. The one or more access techniques can include any of a local access craft port, a remote access port through a Data Communication Network (DCN), a control plane interface, and a Software Defined Networking (SDN) controller interface. The main processor and the main memory can be controllable through the supervisory plane, but the supervisory plane is not controllable through the main processor and the main memory.

The supervisory plane can be accessed through an out-of-band, remote, and secure network, and the supervisory plane is inaccessible through the one or more access techniques. The supervisory plane can utilize a WRITE mode and a READ mode with the main processor and the main memory, the WRITE mode allowing modification from the supervisory plane to the main processor and the main memory, but no modifications are allowed from the main processor and the main memory to the supervisory plane. The READ mode can include providing performance management data from the main processor to the supervisory plane, wherein the performance management data is utilized to detect intrusions or malicious activity associated with the network element. The supervisory plane can be configured to provide authentication for proper use, authenticated users, and operation of the network element. The supervisory plane can be configured to selectively halt/lock the network element where the network element continues to function, but locks further commands or configurations through any of the one or more access techniques.

The supervisory plane can be configured to selectively reset/restore the network element where the main memory is wiped and a main configuration therein deleted, and a selected configuration copy in the secure memory is loaded into the main memory and the network element is rebooted. The supervisory plane can be configured to selectively zeroize the network element where the main memory is wiped and a main configuration therein deleted, and the network element is rebooted. The supervisory plane can be configured to selectively disable the network element to prevent any further use of commands to the network element. The supervisory plane can include a secure boot functionality with an encrypted operate system in the secure memory, configured to selectively load into the main memory. The supervisory plane can be configured to sense a plurality of factors associated with the network element including location, movement, and intrusion-related data, and to report the plurality of factors to a user. The supervisory plane can be configured to provide secure access to one or more virtual machines performing Network Functions Virtualization (NFV) in the network element. The network element can be configured to perform the various network functions at Layers 0, 1, 2, and/or 3+.

In another exemplary embodiment, a supervisory plane, in a network element, to provide secure access and control of the network element, the network element configured to operate in a network to provide various network functions therein, the supervisory plane includes a secure processor communicatively coupled to a secure memory, wherein the supervisory plane is separate from and communicatively coupled to a main processor and main memory, the supervisory plane is configured to allow secure, direct access to the main processor and the main memory; wherein the main processor is configured to perform Operations, Administration, Maintenance, and Provisioning (OAM&P) associated with the network element; and wherein the main processor and the main memory are controllable through the supervisory plane, but the supervisory plane is not controllable through the main processor and the main memory. The supervisory plane can be accessed through an out-of-band, remote, and secure network, and the supervisory plane can be inaccessible through the main processor and the main memory.

In a further exemplary embodiment, a method, in a network element operating in a network and providing various network functions therein, the network element configured with a supervisory plane to provide secure access and control of the network element, the method includes: operating the network element in the network with a main processor and main memory configured to perform Operations, Administration, Maintenance, and Provisioning (OAM&P) associated with the network element; responsive to an event, allowing access to the network element through a supervisory plane with a secure processor communicatively coupled to a secure memory, wherein the supervisory plane is separate from and communicatively coupled to the main processor and the main memory, the supervisory plane is configured to allow secure, direct access to the main processor and the main memory; and performing a secure function with the supervisory plane on the main processor and/or the main memory. The event can be any of an intrusion into the network element, the network element is non-responsive or compromised, and a sensor provides a notification related to remote sensing. The secure function can be any of locking the main memory and the main processor, resetting the network element, zeroizing the network element, and disabling the network element.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, secure access systems and methods are described for network elements operating in a network. The secure access systems and methods include a supervisory plane to allow network operators to regain and retain control of a network device, in the case where security may have been compromised. The supervisory plane is a separate control processor with dedicated memory and associated communications links that can only be accessed from a trusted authority. The purpose of this separate architecture is to allow secure, out-of-band direct access to the main processor and main memory of a network element in the event that the device is non-responsive or compromised. Advantageously, the secure access systems and methods allow a network operator or user to authenticate, initialize, and/or regain control of a network device in the event that its security has been compromised and it is no longer accessible via the management plane. By regaining control, the network operator or user can halt/lock, reset/restore, zeroize or disable the device.

Advantageously, the ability to maintain secure, direct out-of-band access to the main processor and main memory of a network device is critical in today's environment of physical and cyber threats. The supervisory plane grants a trusted authority such as a network operator the ability to maintain this control even in the event that a device is non-responsive or compromised. Several features, including rebooting or erasing the device, will allow the trusted authority to recover from security-related events, or prevent malicious actors from accessing secure data on the device.

Exemplary Network

Figure 1:
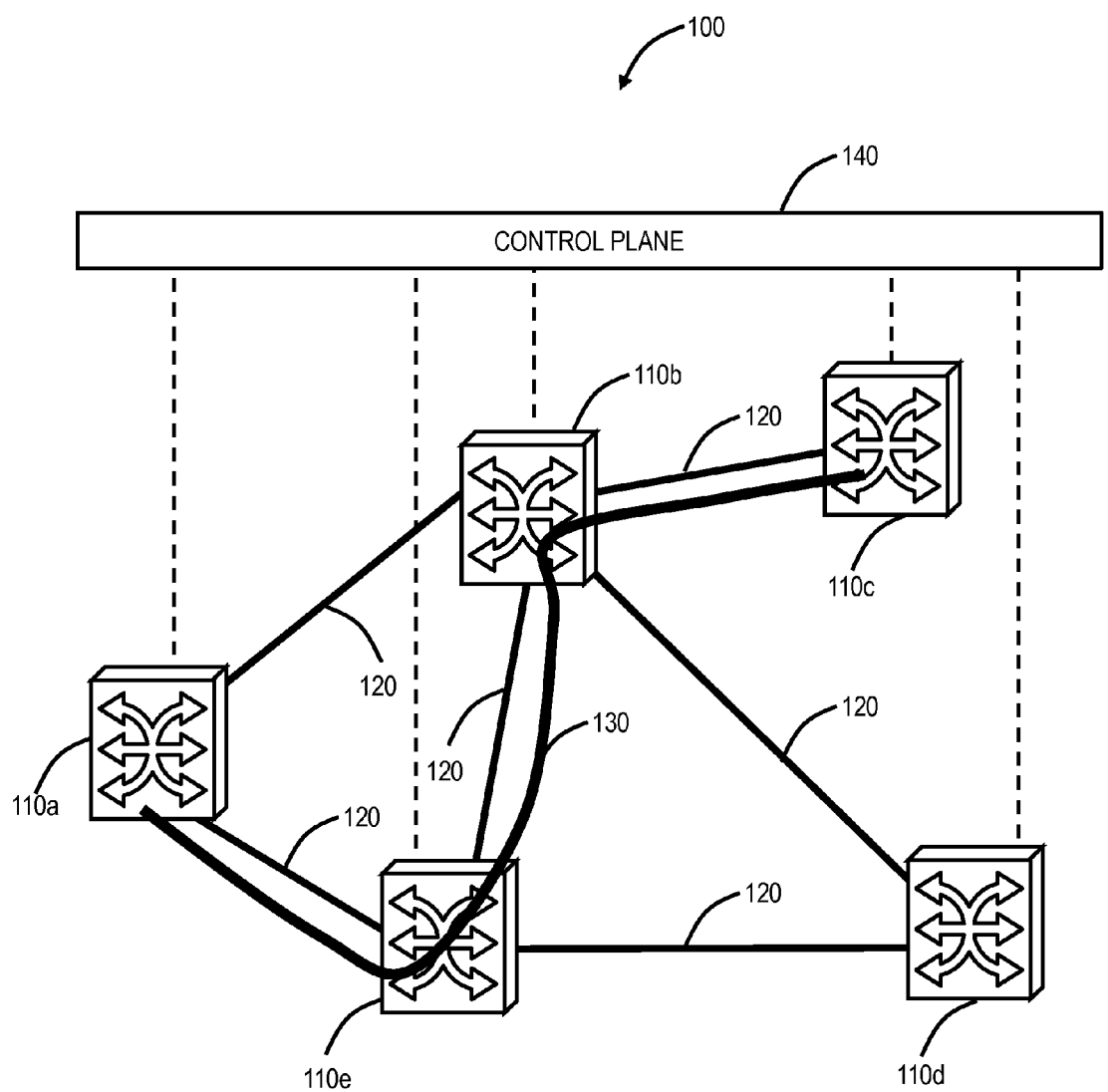
FIG. 1 is a network diagram illustrates an exemplary network with five interconnected nodes.
Figure 2:
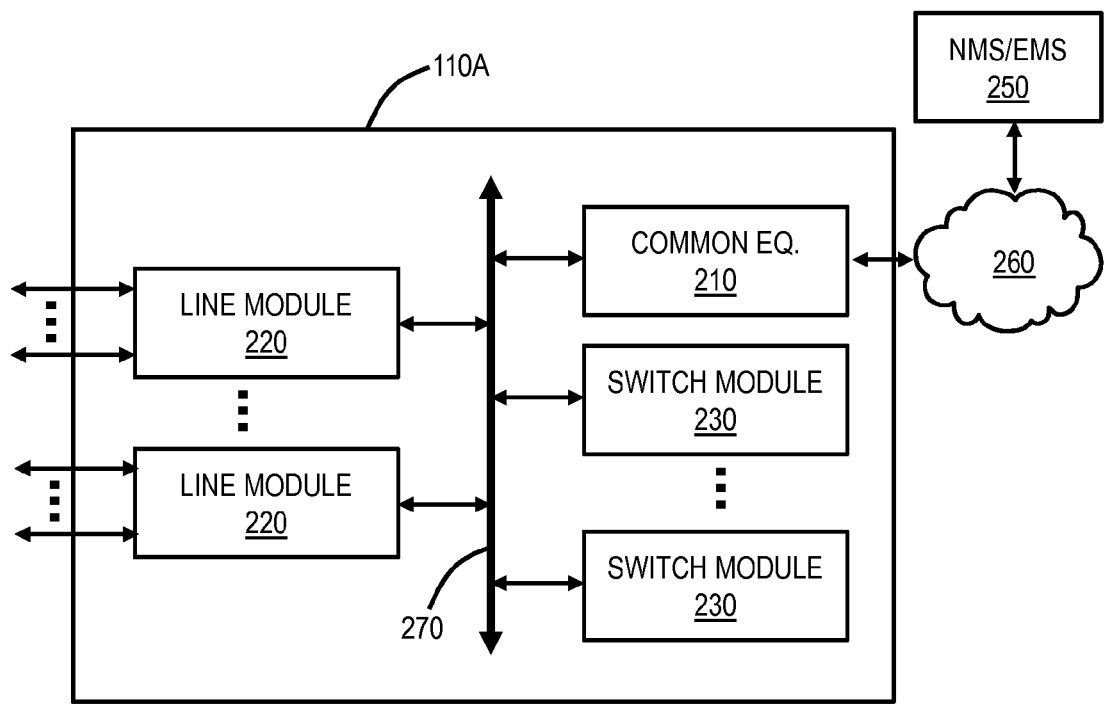
FIG. 2 is a block diagram illustrates an exemplary network element for use with the systems and methods described herein.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. The nodes 110 communicate with one another over the links 120, such as through Wavelength Division Multiplexing (WDM), OTN, Ethernet, Internet Protocol (IP), Multiprotocol Label Switching (MPLS), and the like. The nodes 110 can be network elements which include a plurality of ingress and egress ports forming the links 120. An exemplary network element 110A is illustrated in FIG. 2. The network 100 includes a connection 130 with ingress/egress at the nodes 110a, 110c and intermediate nodes 110b, 110e. The connection 130 can be a Sub-Network Connection (SNC), a Label Switched Path (LSP), an IP flow, and the like. The connection 130 is an end-to-end path or an end-to-end signaled path and from the view of the client signal contained therein, it is seen as a single network segment. Of course, the network 100 can include a plurality of connections. The nodes 110 can also be referred to interchangeably as network elements (NEs). The network 100 is illustrated, for example, as an interconnected mesh network, and those of ordinary skill in the art will recognize the network 100 can include other architectures, with additional nodes 110 or with less nodes 110, etc.

The network 100 can include a control plane 140 operating on and/or between the nodes 110a, 110b, 110c, 110d, 110e. The control plane 140 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize ASON, GMPLS, OSRP, MPLS, Open Shortest Path First (OSPF), Intermediate System-Intermediate System (IS-IS), or the like. Those of ordinary skill in the art will recognize the network 100 and the control plane 140 can utilize any type of control plane for controlling the nodes 110 and establishing and maintaining connections therebetween, such as at and between Layers 0, 1, 2, 3+, etc. Layers 3+ include the network through application layers (Layers 3-7).

Exemplary Network Element/Node

Referring to FIG. 2, in an exemplary embodiment, a block diagram illustrates an exemplary network element 110A for use with the systems and methods described herein. In an exemplary embodiment, the exemplary network element 110A can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM) platform, IP router, etc. into a single, high-capacity intelligent switching system providing Layer 0, 1, 2 and/or 3 consolidation. In another exemplary embodiment, the network element 110A can be any of an OTN Add/Drop Multiplexer (ADM), ROADM, a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the network element 110A can be any digital/optical system with ingress and egress digital/optical signals and switching therebetween of channels, timeslots, tributary units, etc. and/or photonic system with ingress and egress wavelengths and switching therebetween. While the network element 110A is generally shown as an optical network element, the systems and methods contemplated for use with any network device including packet switches, bridges, routers, or the like.

In an exemplary embodiment, the network element 110A includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane and OAM&P processor, such as a controller 300 illustrated in FIG. 3, configured to operate the control plane, along with other functions as described herein. Through the common equipment 210, a user or network operator can gain OAM&P access to the network element 110A, either remotely or locally. The remote access can be via the DCN 260 and/or the management system 250, and the local access can be via a craft interface or management port associated with the network element 110A for switching functions, OAM functions, etc.

The network element 110A can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links to/from the network element 110A. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc. Functionally, the line modules 220 form one or more ports for network access and various functions associated therewith.

Further, the line modules 220 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the network element 110A, and each line module 220 can include one or more physical ports. The switch modules 230 are configured to forward channels, wavelengths, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching), packet switching engines, and/or bridging or routing engines. The switch modules 230 can include redundancy as well, such as 1:1, 1:N, etc. In an exemplary embodiment, the switch modules 230 can provide wavelength switching such as through a Wavelength Selective Switch (WSS) or the like.

Those of ordinary skill in the art will recognize the network element 110A can include other components which are omitted for illustration purposes, and that the systems and methods described herein is contemplated for use with a plurality of different network elements with the network element 110A presented as an exemplary type of a network element. For example, in another exemplary embodiment, the network element 110A may not include the switch modules 230, but rather have the corresponding functionality in the line modules 220 (or some equivalent) in a distributed fashion. For the network element 110A, other architectures providing ingress, egress, and switching therebetween are also contemplated for the systems and methods described herein. In general, the systems and methods described herein contemplate use with any network element providing switching of channels, timeslots, tributary units, wavelengths, etc. with or without use of control plane or the SDN controller. Furthermore, the network element 110A is merely presented as one exemplary network element for the systems and methods described herein.

Exemplary Controller

Figure 3:
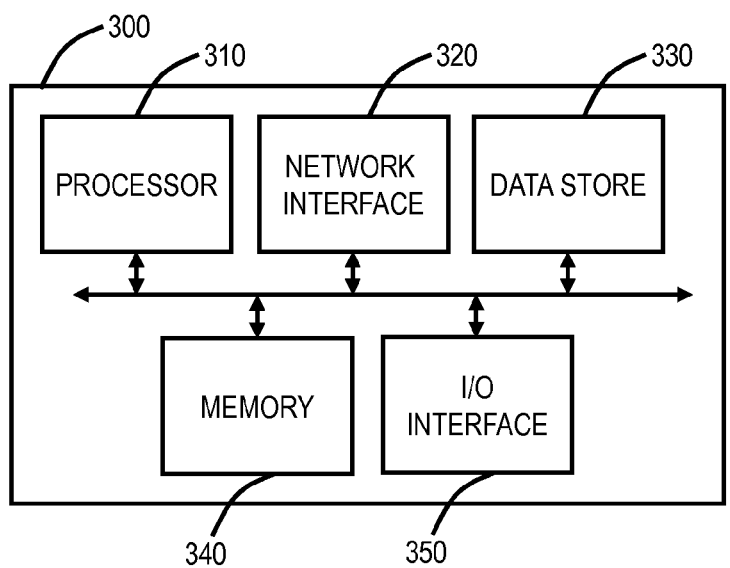
FIG. 3 is a block diagram of a controller to provide control plane processing and/or operations, administration, maintenance, and provisioning (OAM&P) for the network element of FIG. 2.

Referring to FIG. 3, in an exemplary embodiment, a block diagram illustrates a controller 300 to provide control plane processing and/or operations, administration, maintenance, and provisioning (OAM&P) for the network element 110A. The controller 300 can be part of common equipment, such as common equipment 210 in the network element 110A, or a stand-alone device communicatively coupled to the network element 110A via the DCN 260. The controller 300 can include a processor 310 which is a hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an Input/output (I/O) interface 350, and the like, all of which are communicatively coupled therebetween and with the processor 310.

The network interface 320 can be used to enable the controller 300 to communicate on the DCN 260, such as to communicate control plane information to other controllers, SDN controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate with other devices. Further, the I/O interface 350 includes components for the controller 300 to communicate with the other nodes, such as using overhead associated with OTN signals. Also, the controller 300 can implement various routing and signaling protocols to communicate with other nodes and controllers 300 such as, for example, Border Gateway Protocol (BGP), Open Shortest Path First (OSPF), Intermediate System-Intermediate System (IS-IS), Resource Reservation Protocol-Traffic Engineering (RSVP-TE), and the like.

In an exemplary embodiment, the controller 300 is configured to communicate with other controllers 300 in the network 100 to operate the control plane 140 and/or to communicate with the SDN controller. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP over the DCN 260. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within the Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within the Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

Conventional User Interaction with the Network Element

Figure 4:
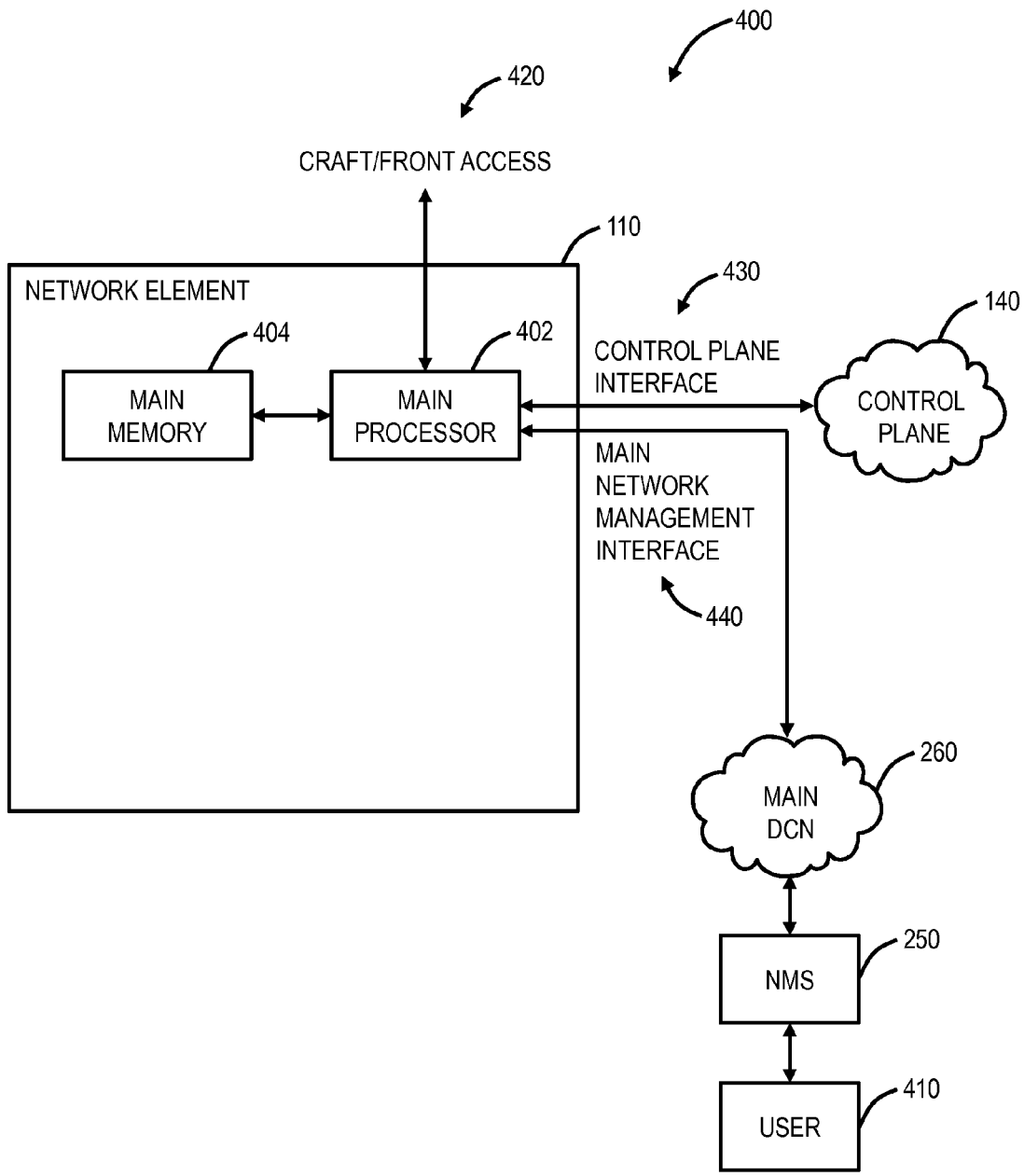
FIG. 4 is a network diagram of a network showing conventional user interaction with a network element.

Referring to FIG. 4, in a conventional embodiment, a network diagram illustrates a network 400 showing conventional user interaction with a network element 110. The network element 110 can be the network element 110A, the nodes 110a, 110b, 110c, 110d, 110e, or the like. The network element 110 includes a main processor 402 and main memory 404. The main processor 402 and the main memory 404 can be part of the common equipment 210, the controller 300, or the like. In an exemplary embodiment, the processor 402 and the main memory 404 can be disposed in the controller 300. Generally, access to the main processor 402 and the main memory 404 provides OAM&P access to the network element 110 and the control plane 140, by a user 410. That is, the main processor 402 and the main memory 404 controls the operations of the network element 110. In an exemplary embodiment, the main processor 402 can be communicatively coupled to various components in the network element 110, such as the line modules 220, the switch modules 230, one or more ports, etc. The main memory 404 holds all the information necessary for the network element 110 to function as designed. This includes the configuration information and data necessary to perform networking functions (e.g. framing, switching, etc.).

The network element 110 generally has three mechanisms for user access—local access 420, control plane or SDN controller access 430, and remote access 440 for applications such as network management. The user access includes performing any functions associated with the network element 110. The local access 420 is through a craft/management port that is physically on the network element 110. For example, the port can include, without limitation, an Ethernet port, Universal Serial Bus (USB) port, a serial port, a parallel port, a Small Computer System Interface (SCSI), a serial ATA (SATA), a fiber channel port, Infiniband, iSCSI, a PCI Express interface (PCI-x), an infrared (IR) interface, a radio frequency (RF) interface, or the like. Thus, the user 410 can utilize the local access 420 by physically being at the same location as the network element 110. The control plane access 430 is via the control plane signaling from the control plane 140. The control plane access 430 is from messaging from other network elements 110 or the management system 250. The remote access 440 is via the DCN 260, such as an Ethernet, IP, etc. connection. The user 410 can be an authorized user, e.g. a network administrator, operator, technician, installer, etc., as well as a malicious user who improperly gains access to the network device 110, through any of the access 420, 430, 440 techniques. The objective herein is to only allow authorized users.

Supervisory Plane Architecture

Figure 5:
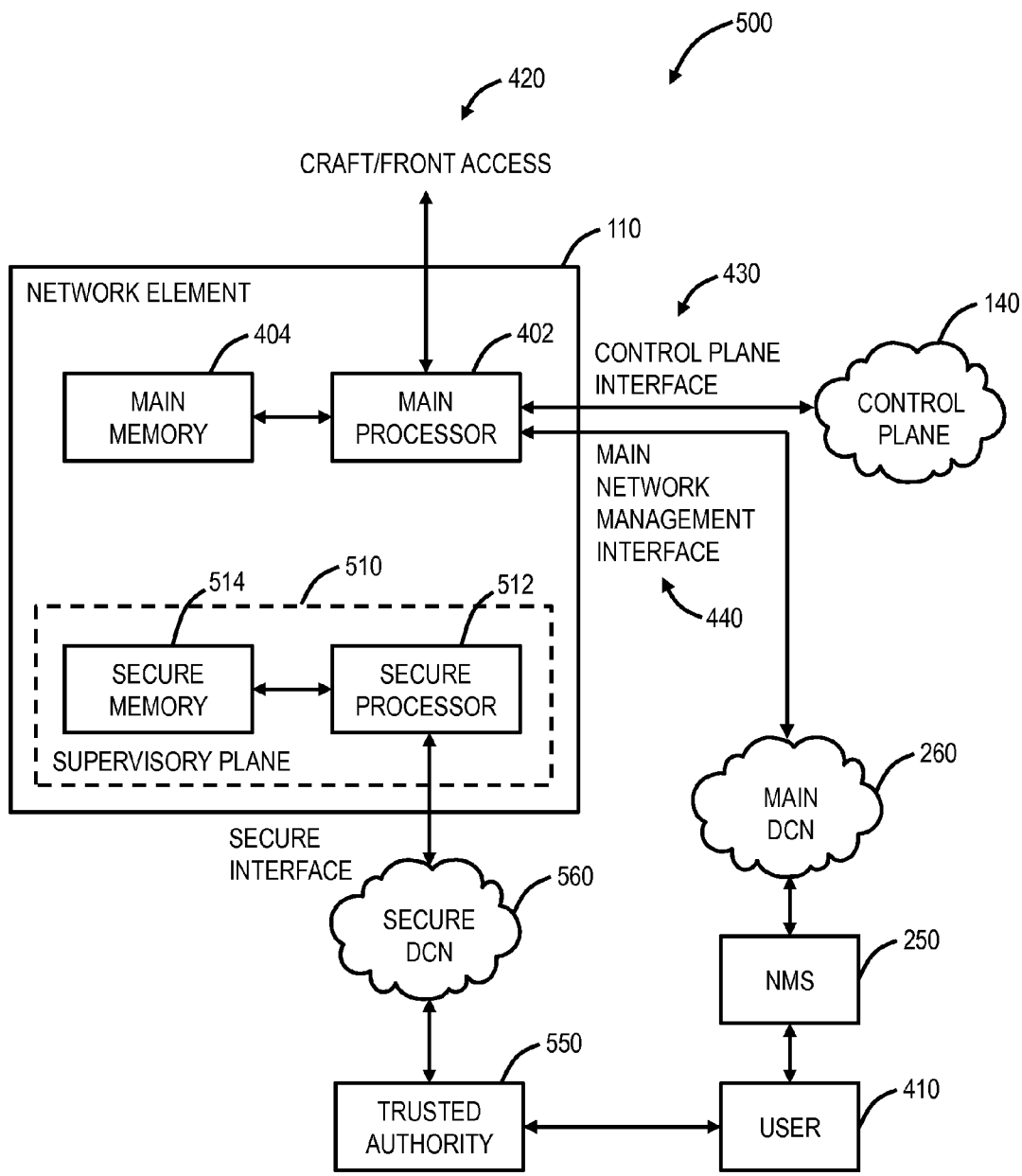
FIG. 5 is a network diagram of a network showing a supervisory plane associated with a network element.

Referring to FIG. 5, in an exemplary embodiment, a network diagram illustrates a network 500 showing a supervisory plane 510 associated with the network element 110. The supervisory plane 510 is a separate complex of a secure processor 512, secure memory 514, and other hardware that is completely isolated from the main processor 402 and the memory 404. The supervisory plane 510 is not accessible from the general management, control, or CRAFT interfaces, associated with the access 420, 430, 440 techniques. The supervisory plane 510 allows the user 410 to regain and retain control of the network element 110, from a malicious user (not shown). The supervisory plane 510 can only be accessed from a trusted authority 550 through a secure DCN 560. The purpose of this separate architecture is to allow secure, out-of-band direct access to the main processor 402 and the main memory 404 in the event that the network element 110 is non-responsive or compromised.

The authorized user 410 connects to the supervisory plane 510 across the secure DCN 560 with is a dedicated, secure network that is independent from the standard management communication network. Access to the supervisory plane 510 is granted only through the use of the trusted authority 550 which is a trusted authority proxy system, allowing secure communications from the user 410 to the supervisory plane 510. The user 410 can interface with a central trusted authority management client for the trusted authority 550. Communications between the user 410 and the trusted authority 550 can be are encrypted via a Secure Socket Layer (SSL)-style of protection, and the user 410 can be authenticated via secure mechanisms. The trusted authority 550 can have the ability to establish protected, two-way communication with the secure processor 512 of any supported network element 110 in a network. A communications channel can be established either by the trusted authority 550 towards the secure processor 512, or it can be initiated in the opposite direction (the secure processor 512 to the trusted authority 550). Additionally, the supervisory plane 510 can be used to distribute encryption keys to the network element 110 if they contain on-board encryption algorithms requiring key material.

Again, the main processor 402 and the main memory 404 can be part of the common equipment 210, the controller 300, or the like. In an exemplary embodiment, the processor 402 and the main memory 404 can be disposed in the controller 300. The supervisory plane 510 including the secure processor 512 and the secure memory 514 can also be part of the common equipment 210, the controller 300, or the like. In an exemplary embodiment, the supervisory plane 510 can be disposed in a same device as the processor 402 and the main memory 404, such as in the controller 300. In another exemplary embodiment, the supervisory plane 510 can be disposed in a different device from the processor 402 and the main memory 404. In all embodiments, the supervisory plane 510 is different hardware from the processor 402 and the main memory 404, with independent and one-way functionality. The independent and one-way functionality means the supervisory plane 510 can control the processor 402 and the main memory 404, but the processor 402 and the main memory 404 cannot control the supervisory plane. Also, while shown separately, the secure DCN 560 and the main DCN 260 can be physically the same network with a single DCN interface on the network element 110. Alternatively, the secure DCN 560 and the main DCN 260 can be physically different networks, with the network element 110 having at least two DCN ports.

Figure 6:
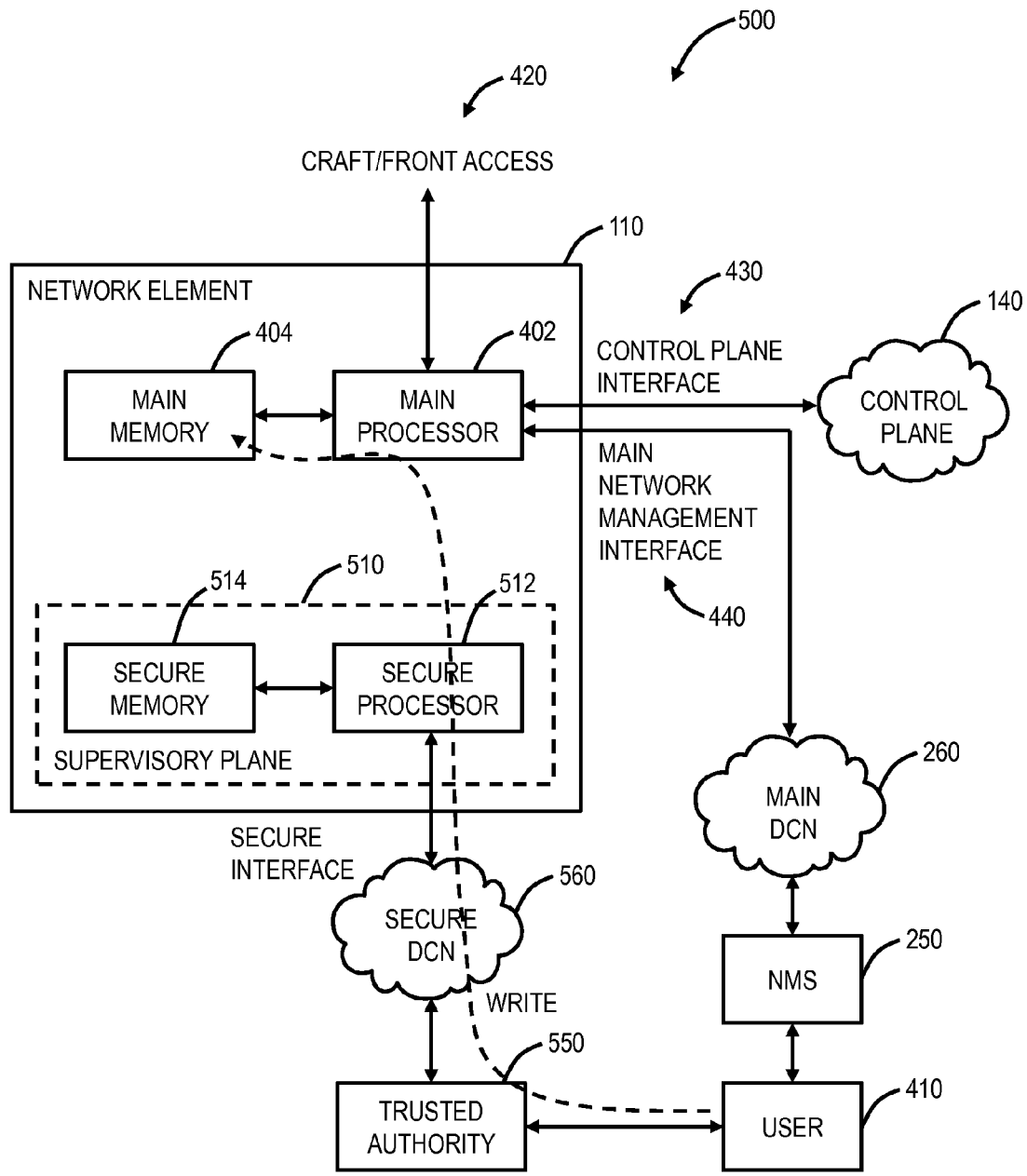
FIG. 6 is a network diagram of the network of FIG. 5 showing a WRITE mode for the supervisory plane.
Figure 7:
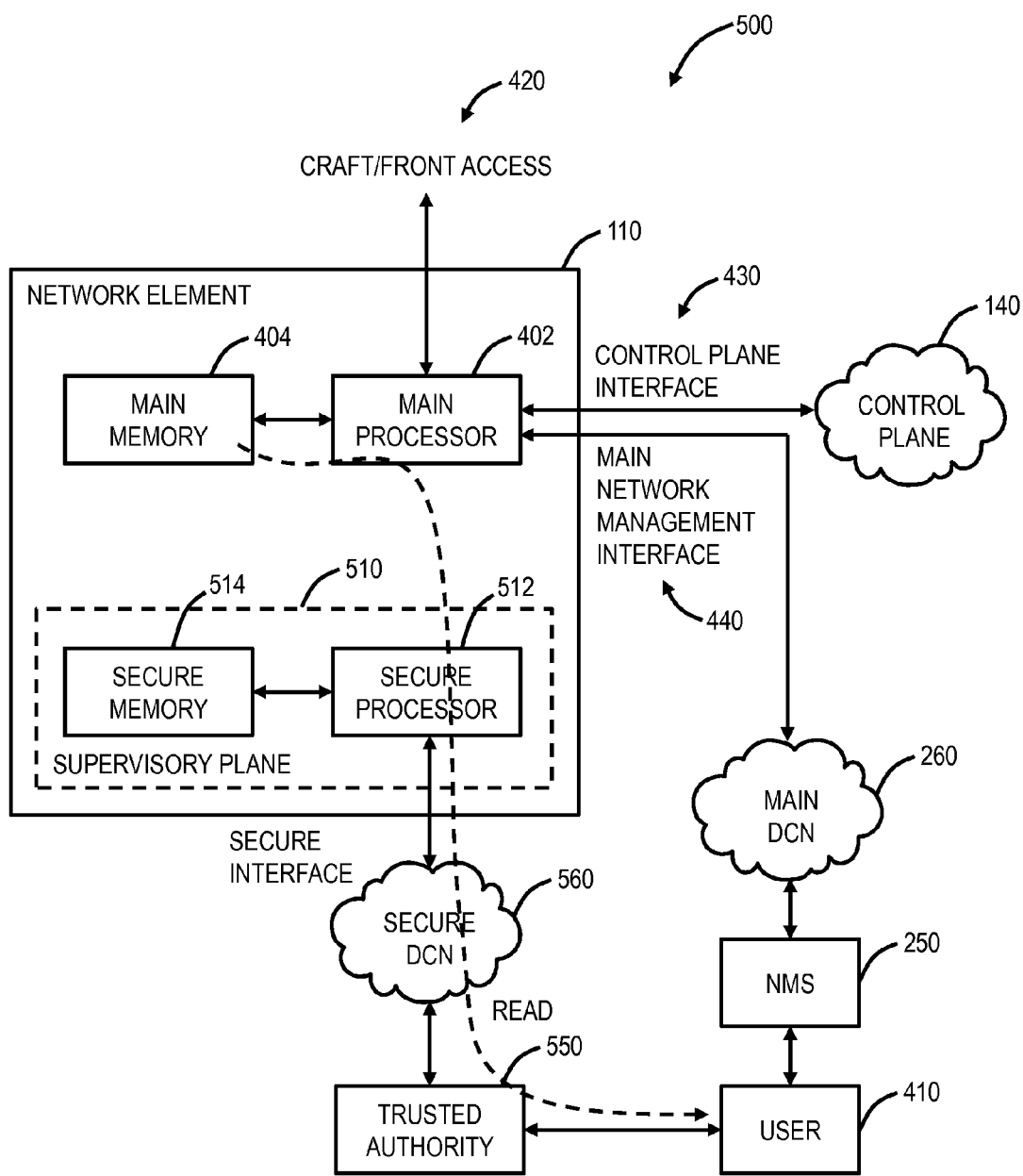
FIG. 7 is a network diagram of the network of FIG. 5 showing a READ mode for the supervisory plane.

Referring to FIGS. 6 and 7, in an exemplary embodiment, network diagrams illustrate the network 500 showing a WRITE mode (FIG. 6) and a READ mode (FIG. 7) for the supervisory plane 510. Specifically, the supervisory plane 510 may communicate with the main control processor 512 and the memory 514 in either a (i) WRITE mode or (ii) READ mode. In the WRITE mode, one-way connections are enabled from the secure processor 512 to the main processor 402 and the main memory 404. These connections allow the secure processor 512 to effect changes to the main processor 402 and the main memory 404, but do not allow modification in the reverse direction. This architecture is attractive because it ensures that the secure memory 514 and the secure processor 512 cannot be compromised by information flowing from the main processor 402 and the main memory 404.

There is an additional utility in having information about the state of the network element 110 flow back through the supervisory plane 510. Various types of performance management data are useful not only to the normal management system 250, but they may also have value from a security perspective through the supervisory plane 510. In this case, a READ channel is established so that information in the main memory 404 can be monitored. However, this READ channel does not compromise the security of the supervisory plane 510. In an exemplary embodiment, the performance management data include performance management data that is used to detect intrusions or malicious activity in the network element 110.

Supervisory Plane Functions

In an exemplary embodiment, the supervisory plane 510 can enable the user 410 to perform the following functions on the network element 110:

| | |
|---|---|
| Authenticate: | The supervisory plane 510 is used to authenticate the proper use, users 410 and operation of the network element 110. |
| Halt/Lock: | The network element 110 will continue to function, but no further commands or configuration changes will be accepted. Specifically, one or more of the access 420, 430, 440 techniques can be selectively halted or locked. |
| Reset/Restore: | The main memory 404 is wiped and the main configuration will be deleted. A copy of the last-known-good configuration, stored in the secure memory 514, can be loaded into the main memory 404. The network element 110 will then be reset (rebooted). |
| Zeroize: | The main memory 404 is wiped and the main configuration will be deleted, then the network element 110 will be reset (rebooted). Zeroisation (also spelled zeroization) is the practice of erasing sensitive parameters (electronically stored data, cryptographic keys, etc.) from the network |

| | |
|---|---|
| Disable (tamper): | element 110 to prevent disclosure if the network element 110 is captured or compromised. A command will be issued that will wipe the main memory 404, delete the configuration and then prevent any further use of the network element 110. The secure processor 512 may also issue this command automatically if it detects an attempt to alter or disable the secure processor 512 or any of its components. |

In the event that the primary in-band and an out-of-band management path are unavailable or unusable, i.e. the access 420, 430, 440 techniques, the supervisory plane 510 can serve to transfer new configuration information from the trusted authority 550 to the secure memory 514. In that case, then a Reset/Restore function can be issued and the network element 110 should restore with the newly transferred configuration.

Secure Boot

The supervisory plane 510 can ensure a secure, tamper-proof environment via techniques similar to pre-boot authentication (PBA) combined with full-system encryption. In order to protect the network element 110 from unauthorized physical access, the operating system and configuration can be encrypted on-board. The pre-boot sequence can be modified so that the first action is to boot normally, and the alternative action is to boot into a lightweight or "dummy" operating system.

In the scenarios where there are no issues with the network element 110, the secure processor 512 can execute commands to boot from the encrypted operating system (and the secure processor 512 contains the keys for any decryption that is necessary.) If problems should occur, for instance the network element 110 has been thrown into tamper mode, the secure processor 512 can then erase the first boot sequence. When this happens, the remaining boot sequence will force the network element 110 to boot from the lightweight or dummy operating system. This special operating system can give the appearance that the box has booted normally, but then the secure processor 512 can initiate phone-home or status reporting type activities to alert the user 410 or the management system 250 that tampering has occurred. The secure processor 512 would then delete any encryption keys in an effort to protect the network element 110. The true operating system, the network element 110 configuration and its data will remain safely encrypted.

Remote Sensing

The supervisory plane 510 can also have the ability to monitor and report back to the trusted authority 550 several parameters, such as:

| | |
|---|---|
| Location: | With Global Positioning Satellite (GPS) enabled, the network element 110 will be able to report its physical location. This can be done on a periodic basis (for example, every 15 minutes) or the like. Any change in position can be alarmed upon by the trusted authority 550 and reported to the user 410. |
| Movement: | In the event that GPS signals are not available, an accelerometer can be installed in the secure processor 512 system to allow the detection of movement or physical tampering of the network element 110. |
| Intrusion: | The quality (or existence) of signals on the network links can be detected and reported as possible mechanisms to indicate the detection of unauthorized intrusion. For instance, if a line experiences a drop in signal strength (perhaps indicating a breach of signal somewhere on the line,) that information can be reported back to the trusted authority 550. Loss of Signal (LoS) can also be monitored and reported for possible indication of communications interruption. For example, the line can be an optical fiber and the drop in signal can be variations of optical power due to someone maliciously tapping the optical fiber for an intrusion. |

Virtual Machine Communication

Figure 8:
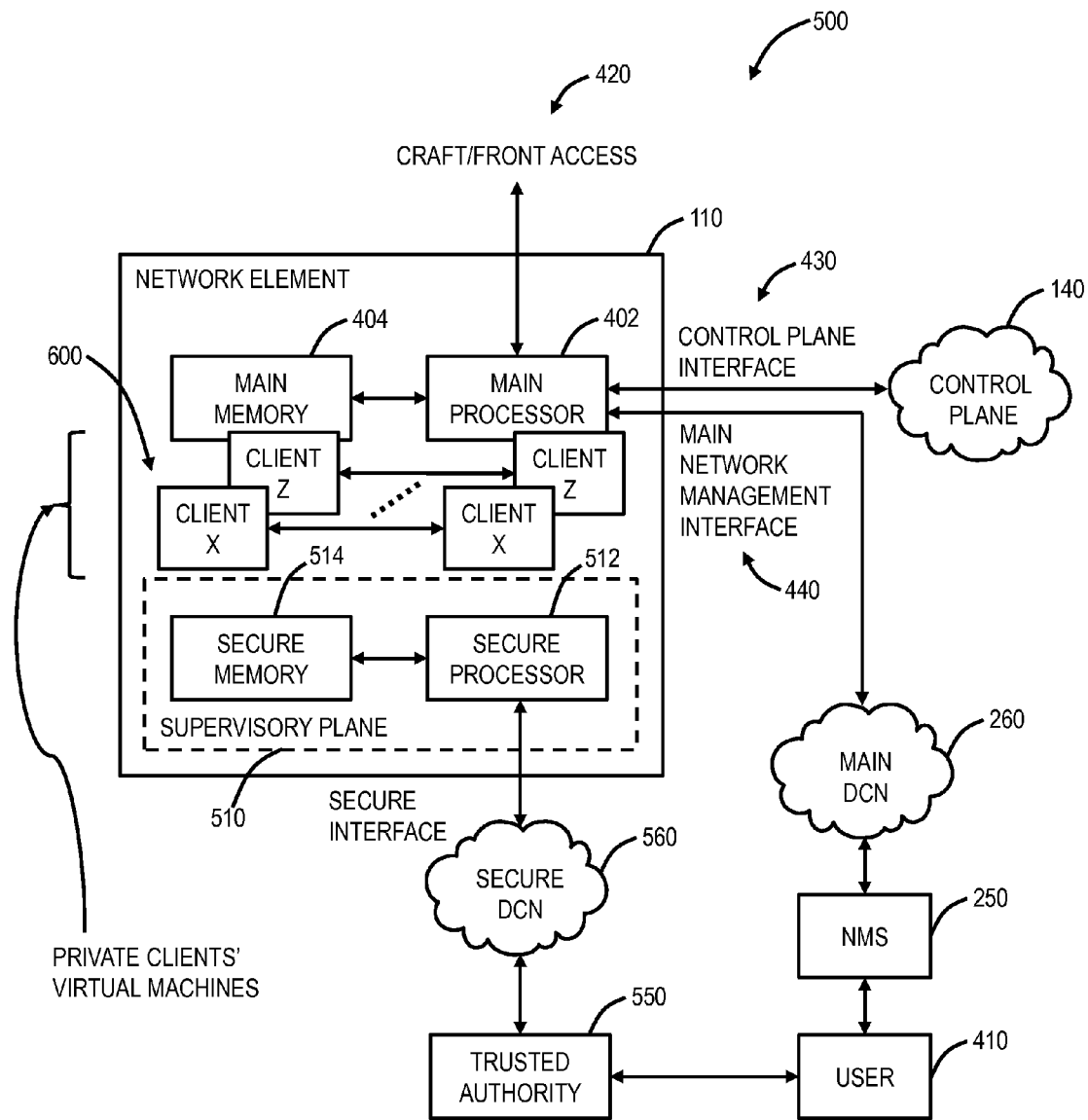
FIG. 8 is a network diagram of the network of FIG. 5 with virtual machines supporting multiple clients' virtual programmable networks (VPNs)

Referring to FIG. 8, in an exemplary embodiment, a network diagram illustrates the network 500 with virtual machines 600 supporting multiple clients' Virtual Private Networks (VPNs). With Network Functions Virtualization (NFV), the functions that a network performs are shifting from physical devices to virtual machines. How these virtual machines interact and communicate, and how customer clients access their own private data on these virtual machines 600 needs to be secured.

Each of the virtual machines 600 must establish a secure line of communication back to a central controller. The controller would then have the ability to push certain functional applications to the virtual machine 600. This line of communication would also allow any kind of function-specific data to flow back to the controller. Once there, data can be stored, processed and viewed. Metadata associating the data to specific customers would allow the creation of customer-specific views of the data. For example, a customer client may have use of a virtual slice of the optical backbone, and therefore only performance data related to their ports would be available in their view.

Additionally, entire virtual machines 600 dedicated to a customer or specific functions of the virtual machines 600 dedicated to customers may be accessed via a secure channel through the supervisory plane 510. A trusted authority can perform supervisory functions on any individual virtual machine 600. This channel can be initiated through the central controller or through the trusted authority indirectly via an interface to the customer, or a secure client on the customer client premises can be used to establish connectivity with virtual machine 600 or specific function.

Supervisory Plane Method

Figure 9:
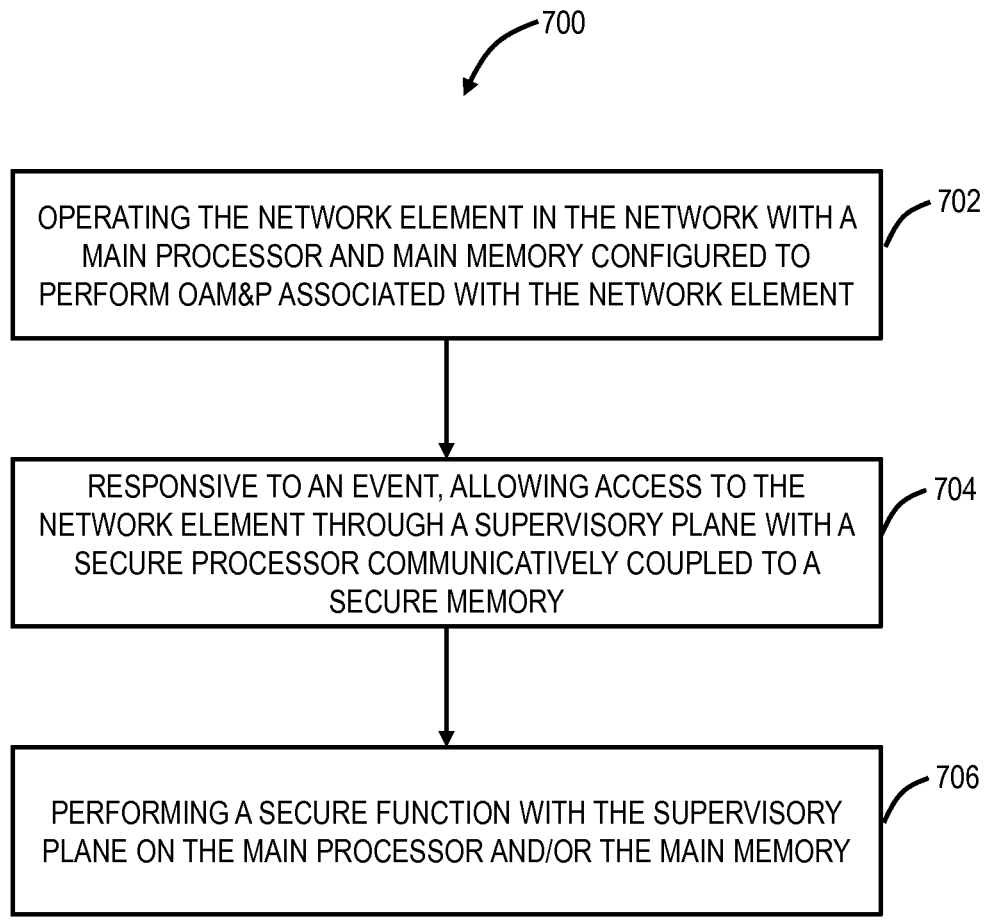
FIG. 9 is a flow chart of a method, in a network element operating in a network and providing various network functions therein, the network element configured with the supervisory plane to provide secure access and control of the network element.

Referring to FIG. 9, in an exemplary embodiment, a flow chart illustrates a method 700, in a network element operating in a network and providing various network functions therein, the network element configured with the supervisory plane 510 to provide secure access and control of the network element. The network element can be the network element 110. The method 700 includes operating the network element in the network with a main processor and main memory configured to perform Operations, Administration, Maintenance, and Provisioning (OAM&P) associated with the network element (step 702). The method 700 also includes, responsive to an event, allowing access to the network element through a supervisory plane with a secure processor communicatively coupled to a secure memory (step 704). The supervisory plane is separate from and communicatively coupled to the main processor and the main memory, and the supervisory plane is configured to allow secure, direct access to the main processor and the main memory. The method 700 includes performing a secure function with the supervisory plane on the main processor and/or the main memory (step 706). The event can be any of an intrusion into the network element, the network element is non-responsive or compromised, and a sensor provides a notification related to remote sensing. The secure function can be any of locking the main memory and the main processor, resetting the network element, zeroizing the network element, and disabling the network element.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element, configured to operate in a network to provide various network functions therein, the network element comprising:
   a main processor communicatively coupled to a main memory, wherein the main processor is configured to perform Operations, Administration, Maintenance, and Provisioning (OAM&P) associated with the network element, wherein the main processor is accessible through a plurality of access techniques comprising an access port communicatively coupled to a Data Communication Network (DCN) and signaling through overhead of data signals received by the network element; and
   a supervisory plane comprising a secure processor and a secure memory communicatively coupled thereto, wherein the supervisory plane is separate from and communicatively coupled to the main processor and the main memory, the supervisory plane is configured to allow secure, direct access to the main processor and the main memory, and wherein the secure processor is accessible via a secure DCN.

2. The network element of claim 1, wherein the main processor is accessible via any of a local access craft port, the Data Communication Network (DCN), a control plane interface via the signaling, and a Software Defined Networking (SDN) controller interface.

3. The network element of claim 1, wherein the main processor and the main memory are controllable through the supervisory plane, but the supervisory plane is not controllable through the main processor and the main memory.

4. The network element of claim 1, wherein the supervisory plane is accessed through an out-of-band, remote, and secure network, and the supervisory plane is inaccessible through the plurality of access techniques.

5. The network element of claim 1, wherein the supervisory plane utilizes a WRITE mode and a READ mode with the main processor and the main memory, the WRITE mode allowing modification from the supervisory plane to the main processor and the main memory, but no modifications are allowed from the main processor and the main memory to the supervisory plane.

6. The network element of claim 5, wherein the READ mode includes providing performance management data from the main processor to the supervisory plane, wherein the performance management data is utilized to detect intrusions or malicious activity associated with the network element.

7. The network element of claim 1, wherein the supervisory plane is configured to provide authentication for proper use, authenticated users, and operation of the network element.

8. The network element of claim 1, wherein the supervisory plane is configured to selectively halt/lock the network element where the network element continues to function, but locks further commands or configurations through any of the plurality of access techniques.

9. The network element of claim 1, wherein the supervisory plane is configured to selectively reset/restore the network element where the main memory is wiped and a main configuration therein deleted, and a selected configuration copy in the secure memory is loaded into the main memory and the network element is rebooted.

10. The network element of claim 1, wherein the supervisory plane is configured to selectively zeroize the network element where the main memory is wiped and a main configuration therein deleted, and the network element is rebooted.

11. The network element of claim 1, wherein the supervisory plane is configured to selectively disable the network element to prevent any further use of commands to the network element.

12. The network element of claim 1, wherein the supervisory plane includes a secure boot functionality with an encrypted operate system in the secure memory, configured to selectively load into the main memory.

13. The network element of claim 1, wherein the supervisory plane is configured to sense a plurality of factors associated with the network element including location, movement, and intrusion-related data, and to report the plurality of factors to a user.

14. The network element of claim 1, wherein the supervisory plane is configured to provide secure access to one or more virtual machines performing Network Functions Virtualization (NFV) in the network element.

15. The network element of claim 1, wherein the network element is configured to perform the various network switching and transport functions at Layers 0, 1, 2, and/or 3+.

16. A supervisory plane, in a network element, to provide secure access and control of the network element, the network element configured to operate in a network to provide various network functions therein, the supervisory plane comprising:

a secure processor communicatively coupled to a secure memory, wherein the supervisory plane is separate from and communicatively coupled to a main processor and main memory, the supervisory plane is configured to allow secure, direct access to the main processor and the main memory, and wherein the secure processor is accessible via a secure Data Communication Network (DCN);

wherein the main processor is configured to perform Operations, Administration, Maintenance, and Provisioning (OAM&P) associated with the network element, wherein the main processor is accessible through a plurality of access techniques comprising an access port communicatively coupled to a DCN and signaling through overhead of data signals received by the network element; and wherein the main processor and the main memory are controllable through the supervisory plane, but the supervisory plane is not controllable through the main processor and the main memory.

17. The supervisory plane of claim 16, wherein the supervisory plane is accessed through an out-of-band, remote, and secure network, and the supervisory plane is inaccessible through the main processor and the main memory and through the plurality of access techniques.

18. A method, in a network element operating in a network and providing various network functions therein, the network element configured with a supervisory plane to provide secure access and control of the network element, the method comprising:

operating the network element in the network with a main processor and main memory configured to perform Operations, Administration, Maintenance, and Provisioning (OAM&P) associated with the network element, wherein the main processor is accessible through a plurality of access techniques comprising an access port communicatively coupled to a Data Communication Network (DCN) and signaling through overhead of data signals received by the network element;

responsive to an event, allowing access to the network element through a supervisory plane with a secure processor communicatively coupled to a secure memory, wherein the supervisory plane is separate from and communicatively coupled to the main processor and the main memory, the supervisory plane is configured to allow secure, direct access to the main processor and the main memory, and wherein the secure processor is accessible via a secure DCN; and performing a secure function with the supervisory plane on the main processor and/or the main memory.

19. The method of claim 18, wherein the event is any of an intrusion into the network element, the network element is non-responsive or compromised, and a sensor provides a notification related to remote sensing.

20. The method of claim 18, wherein the secure function is any of locking the main memory and the main processor, resetting the network element, zeroizing the network element, and disabling the network element.

\* \* \* \* \*